United States Patent [19]

Helmetsie

[11] Patent Number: 4,823,963
[45] Date of Patent: Apr. 25, 1989

[54] TRAY FOR ORGANIZING ORIGINALS IN A PHOTOCOPY MACHINE

[75] Inventor: Eugene A. Helmetsie, Spencer, N.Y.
[73] Assignee: Ozalid Corp., Binghamton, N.Y.
[21] Appl. No.: 167,038
[22] Filed: Mar. 11, 1988
[51] Int. Cl.$^4$ ............................................. A47F 7/00
[52] U.S. Cl. ....................................... 211/50; 211/126
[58] Field of Search .................. 211/50, 55, 126, 128, 211/56, 13; 271/213

[56] References Cited

U.S. PATENT DOCUMENTS

| | | | |
|---|---|---|---|
| 3,474,912 | 10/1969 | Pekera et al. | 211/50 |
| 4,245,834 | 1/1981 | Songer et al. | 211/50 X |
| 4,544,065 | 10/1985 | Mueller | 211/50 X |
| 4,588,094 | 5/1986 | Evans | 211/126 X |
| 4,666,201 | 5/1987 | Chap | 211/126 X |

Primary Examiner—J. Franklin Foss
Assistant Examiner—Sarah A. Lechok Eley
Attorney, Agent, or Firm—Kane, Dalsimer, Sullivan, Kurucz, Levy, Eisele and Richard

[57] ABSTRACT

This invention relates to a rack with two parallel trays adapted for use with a photocopy or similar machine, particularly a wide-format machine. One tray holds originals yet to be copied while the other tray holds originals already copied. The rack fits over and behind the photocopy machine so as to not require any additional workspace.

4 Claims, 3 Drawing Sheets

TRAY FOR ORGANIZING ORIGINALS IN A PHOTOCOPY MACHINE

BACKGROUND OF INVENTION

1. Field of Invention

The present invention relates to a tray with two parallel racks for organizing wide format originals in conjunction with the use of a photocopy machine. One rack is used for originals yet to be photocopied, the other rack is used for originals already photocopied.

2. Description of the Prior Art

In the prior art, a user of a wide-format photocopier or similar apparatus, such as is used with engineering drawings, would have to maintain two separate stacks of wide-format originals—one stack of originals yet to be copied, and one stack of originals already copied. The user would manually take the originals from the first stack, feed them through the photocopier, retrieve them for the photocopier, and place them in the second stack. This is a very inefficient use of work space. Such space requirements limit the number of locations where a wide-format photocopier may be placed. Further, the user of such a machine may have to walk from the stacks to the photocopier thereby impeding his efficiency.

OBJECTS AND SUMMARY OF THE INVENTION

It is therefore an object of this invention to provide a compact means for holding two stacks of wide-format originals in close proximity to the photocopying machine without the need for an additional work area.

Therefore, the present invention provides a rack with two parallel trays. One tray is for originals yet to be copied. The other is for originals after they have been copied. The rack is shaped so as to fit over the top and behind the rear of a wide format photocopy machine so as to gently shape the originals without permanent deformation.

The rack is attached to the photocopy machine by hinging means so as to allow access to the rear of the photocoyping machine.

DETAILED DESCRIPTION OF THE PREFERRED EMBODIMENT

Figure 1:
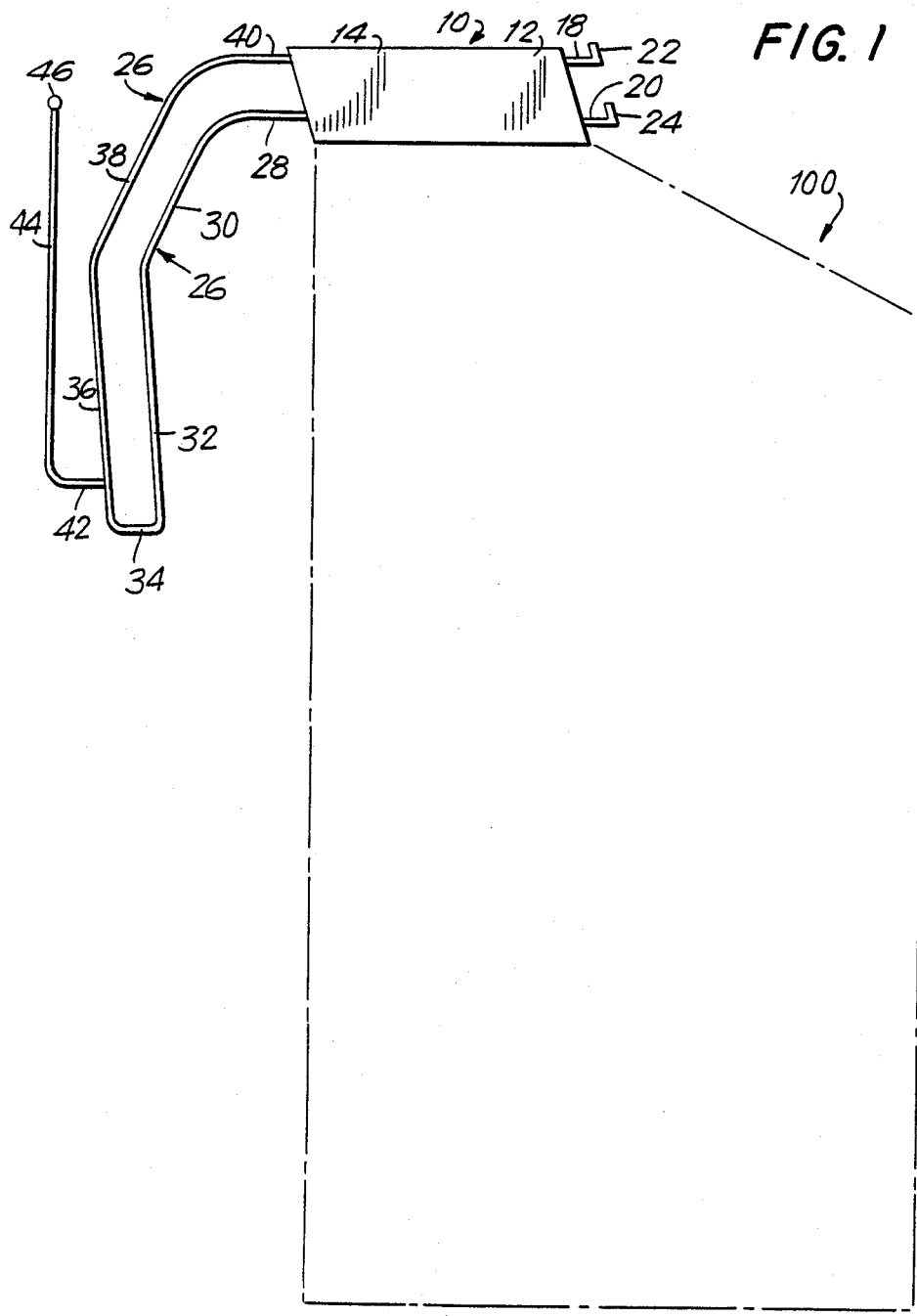
FIG. 1 shows a side view partly in elevation of the present invention with a photocopy machine shown in phantom.
Figure 2:
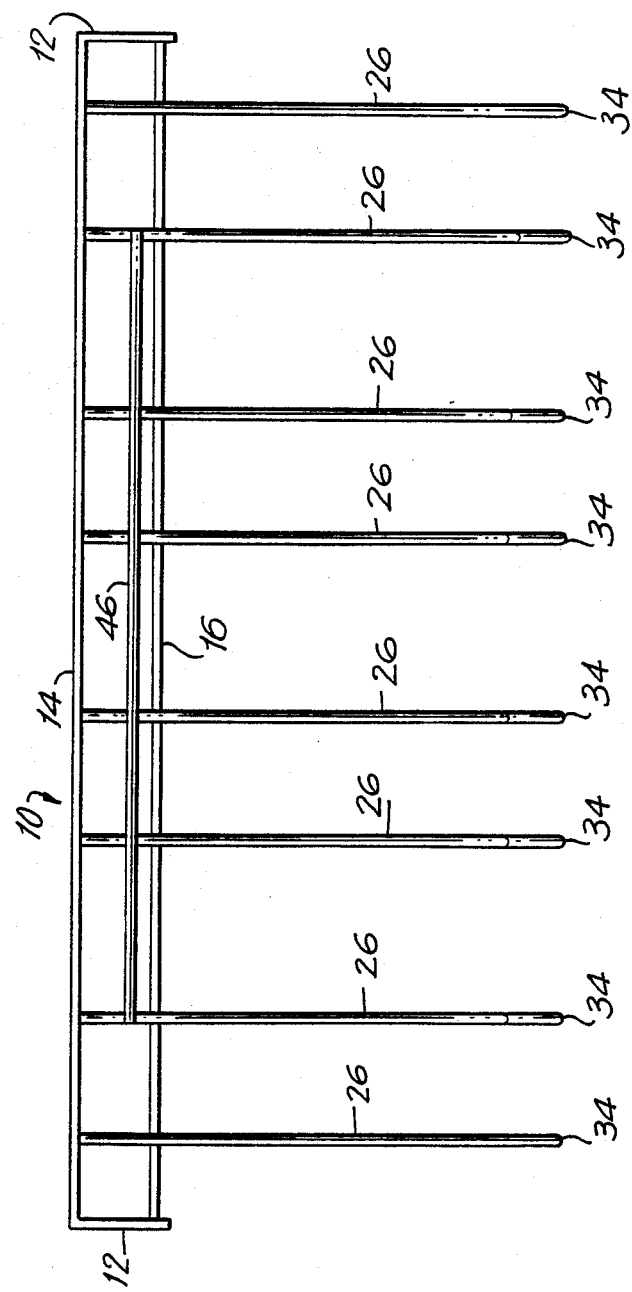
FIG. 2 shows a front view partly in elevation of the present invention.
Figure 3:
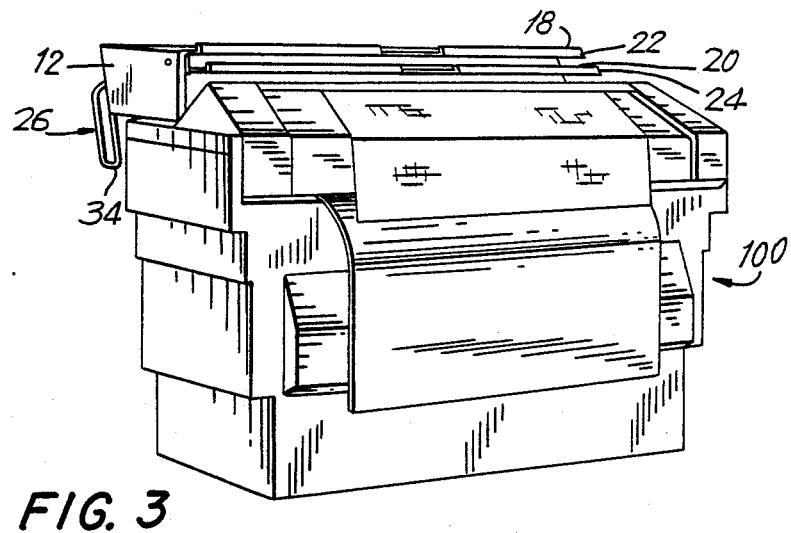
FIG. 3 shows a front view in perspective of a photocopy machine with originals loaded into both trays of the invention.
Figure 4:
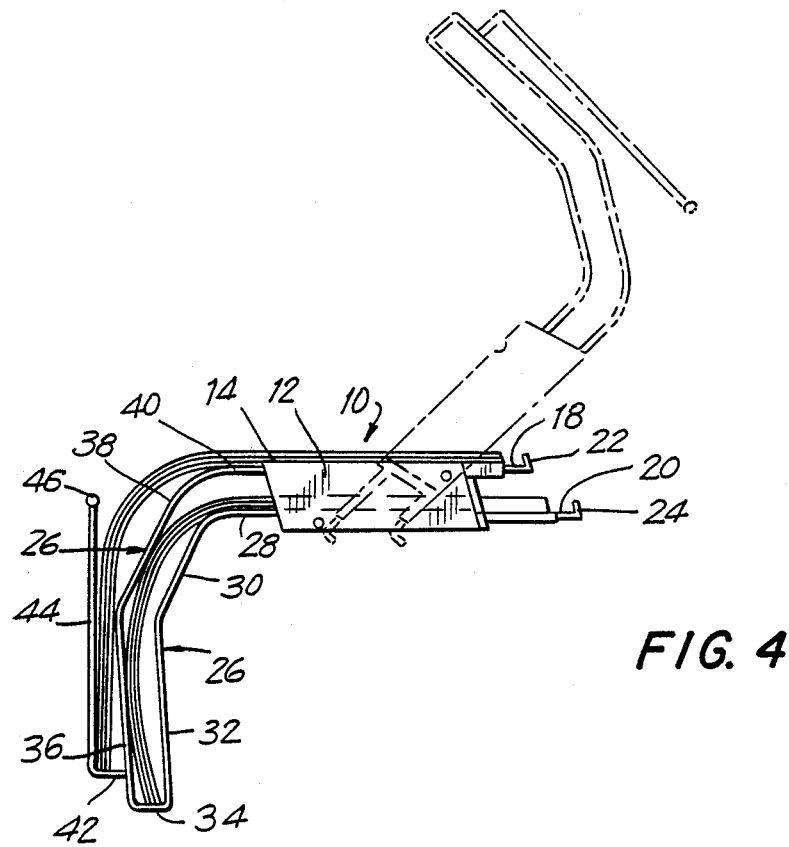
FIG. 4 shows a side view of the present invention partly in elevation in a swing position so as to allow access to the rear of the photocopy machine.

Referring now to the drawings in detail wherein like numbers indicate like elements throughout the several views, rack 10 is shown in FIG. 1. Braces 12 attach both sides of rack 10 to photocopy machine 100. Braces 12 are hinged so as to allow rack 10 to swing upward to allow access to the rear portion of photocopy machine as shown in FIG. 4. Upper and lower sheet metal cross members 14 and 16 attach the braces 12 to each other and provide a smooth opening surface for upper and lower trays 18 and 20. Cross members 14 and 16 have a vertical lip 22 and 24 on their front opening ends. Upper and lower tray 18 and 20 extensions are formed by metal tubing loops 26. Metal tubing loops 26 comprise a horizontal portion 28 which extends from lower cross member 16 to diagonally descending portion 30. Diagonally descending portion 30 forms an angle of approximately 60° with the horizontal and extends to vertically descending portion 32. Vertically descending portion 32 extends to horizontal terminal portion 34. A second vertically descending portion 36, diagonally descending portion 38 and horizontally extending portion 40 run parallel to the aforementioned corresponding elements (32, 30, and 28 respectively), joining upper cross member 14 to the opposing end of horizontal terminal portion 34 thereby forming lower tray 20. Further, elements 36, 38 and 40 form not only the outward portion of lower tray 20 but also the inward portion of upper tray 18. The outward portion of upper tray 18 is formed by upper tray terminal portion 42 extending horizontally from the lower end of second vertically descending portion 36 to upper tray vertical portion 44.

In order to use rack 10, the user attaches the rack to photocopy machine 100 and fills lower tray 20 with originals to be copied. He removes these originals one at a time from lower tray 20 and feeds them into photocopy machine 100. After each original 16 is duplicated, but before feeding the subsequent original into photocopy machine 100, the user removes the original and its duplicate from the photocopy machine 100. The original, and possibly its duplicate are then placed in upper tray 18. This procedure keeps the originals yet to be duplicated separate from the originals already duplicated without using valuable working space. This also allows the photocopy machine to be placed in tight confines and permits the user to perform the above-described procedure without having to walk from one place to another.

What is claimed is:

1. A rack for a photocopy machine comprising:
   a first tray;
   a second tray above and parallel to said first tray; and
   hinged bracket means to hold said first and second trays to a top surface of the photocopy machine;
   said first and second trays having a horizontal input portion, a vertical storage portion, and a diagonal transition portion therebetween;
   said first and second trays being adapted to hold wide-format originals for the photocopy machine.

2. The rack of claim 1 wherein said horizontal input portions of said first tray and said second tray are over the photocopy machine and said vertical storage portions of said first tray and said second tray extend behind the photocopy machine.

3. The rack of claim 2 wherein said first and said second trays are comprised of tubular portions.

4. The rack of claim 1 wherein said hinged bracket means swings the rack away from the photocopy machine.

* * * * *